United States Patent
Gründl et al.

(10) Patent No.: US 7,049,716 B2
(45) Date of Patent: May 23, 2006

(54) FLUID COOLED ELECTRIC MACHINE

(75) Inventors: Andreas Gründl, München (DE); Bernhard Hoffmann, Starnberg (DE)

(73) Assignee: Compact Dynamics GmbH, Bavaria (DE)

( * ) Notice: Subject to any disclaimer, the term of this patent is extended or adjusted under 35 U.S.C. 154(b) by 13 days.

(21) Appl. No.: 10/471,474

(22) PCT Filed: Mar. 15, 2002

(86) PCT No.: PCT/EP02/02909

§ 371 (c)(1),
(2), (4) Date: Apr. 5, 2004

(87) PCT Pub. No.: WO02/075901

PCT Pub. Date: Sep. 26, 2002

(65) Prior Publication Data

US 2004/0164625 A1    Aug. 26, 2004

(30) Foreign Application Priority Data

Mar. 16, 2001  (DE) ............................... 101 12 799

(51) Int. Cl.
*H02K 9/00*    (2006.01)

(52) U.S. Cl. ........................................ 310/52; 310/54
(58) Field of Classification Search ................ 310/52, 310/54, 58, 64, 68 R See application file for complete search history.

(56) References Cited

U.S. PATENT DOCUMENTS

| 3,562,564 A | 2/1971 | Potter |
| 3,733,503 A * | 5/1973 | Potter ........................ 310/68 D |
| 5,491,370 A * | 2/1996 | Schneider et al. ............ 310/54 |

FOREIGN PATENT DOCUMENTS

| DE | 2325771 | 1/1974 |
| DE | 3941474 A1 | 6/1991 |
| DE | 4038663 A1 | 6/1991 |
| DE | 4131463 A1 | 4/1992 |
| DE | 4230510 C1 | 9/1993 |
| DE | 4217289 A1 | 12/1993 |
| DE | 4244721 A1 | 4/1994 |
| DE | 4311518 A1 | 10/1994 |
| DE | 19645635 C1 | 4/1998 |

* cited by examiner

*Primary Examiner*—Darren Schuberg
*Assistant Examiner*—Nguyen N. Hanh
(74) *Attorney, Agent, or Firm*—Wood, Herron & Evans, LLP

(57) ABSTRACT

The invention concerns a fluid-cooled electrical machine with a housing in which are arranged a stator and a rotor with stator and/or rotor coils, wherein the electrical machine is coupled heat-conductively with a cooling device arranged on its periphery and connected with an electronic power control. The electronic power control is divided into several modules, each of which are electrically connected with at least one of the stator and/or rotor coils, wherein the modules are arranged distributed on the periphery of the electrical machine and coupled heat-conductively with the cooling device.

11 Claims, 1 Drawing Sheet

FLUID COOLED ELECTRIC MACHINE

BACKGROUND TO THE INVENTION

The invention concerns a fluid-cooled electrical machine with a housing in which are arranged a stator and a rotor with stator and/or rotor coils, wherein the electrical machine is coupled heat-conductively with a cooling device arranged on its periphery, and is connected with an electronic power control. Fluid-cooled machines, depending on area of application, are cooled with either oil or water, wherein the fluid is transported by a pump activated either by the electrical machine itself or by a separate drive.

DEFINITION OF TERMS

The term "electrical machine" here means an electrical rotating machine in the form of an internal or external rotor machine. An electrical machine can be both an electric motor and an electrical generator. The invention applies in particular to rotating machines of all types (synchronous, asynchronous and reluctance machines, permanently excited machines or similar).

PRIOR ART

In the prior art, it is known to operate electrical machines, in particular alternating field machines, with frequency converters. Usually these frequency converters contain half-bridge arrangements in a number equal to the number of phases of the electrical machine and supplied with control signals from the control electronics. Thus, depending on whether the electrical machine is operated as a motor or a generator, either the electrical power is supplied to the electrical machine for the required rotation speed and required torque or the electrical power is taken from the electrical machine and converted into the amount and phase state required for the subsequent consumers. The frequency converters are arranged separately from the electrical machines and connected with these via multiphase power cables.

An example of such a configuration of the power electronics for an electrical machine is described in DE 42 30 510 A1. Here the concept is followed of arranging the electronics in a heat-bath cooler, wherein the power supplies, the control signals for the control electronics etc. are supplied to this pressure-tight encapsulated arrangement via a central opening in the base of the capsule.

DE 43 11 518 A1 discloses a drive device for a vehicle with an electric drive motor supplied via a converter. On the outer periphery of the drive motor are arranged cooling tubes lying on a housing of the drive motor. Components of the converter are divided into two assemblies arranged separately on the housing of the drive motor and each connected heat-conductively with the cooling tubes of the drive motor via a base plate lying on these cooling tubes.

DE 39 41 474 A1 describes a fluid-cooled electrical generator with two stator windings, each electrically connected with its own rectifier blocks.

DE 196 45 635 C1 discloses a control device to control the electric motor of motor vehicles in which function units integrated in a housing body are formed as separate function modules and separated from each other both functionally and spatially.

DE 42 17 289 A1 discloses a fluid-cooled power transistor arrangement with several semiconductor elements constructed in modular fashion next to each other in the form of one or more half or full bridges.

DE 40 38 663 A1 describes an alternator for vehicles with a cooling device, wherein the cooling device has a coolant orbit path which has a flow path on the inside and can be supplied with coolant from the outside. Arranged on the outer surface of the orbit path are a rectifier and a voltage regulator.

DE 41 31 463 A1 discloses an alternating current generator for a motor vehicle with a housing located inside a sump with supply and outlet lines for a coolant. A housing cover has openings for the coolant, wherein the rectifier and a regulator are attached to the outside of the cover opposite the openings.

DE 42 44 721 A1 discloses an electrical machine, the windings of which are in heat-exchange contact with a fluid cooling arrangement. The cooling arrangement generates a forced flow of a coolant in a coolant channel which is combined with the windings into one assembly.

The problem above all here is the cabling complexity and the electromagnetic screening required due to the lines between the electrical machine and the frequency converter. Also there is a considerable need for plug connectors both on the frequency converter side and on the electrical machine side. The cooling of the power electronics of the frequency converter also requires significant expenditure. As a further problem it is practically impossible to repair such an encapsulated frequency converter without opening the pressure-tight capsule. Sealing the capsule is possible only with considerable expenditure. Even minor defects on the encapsulated frequency converter thus mean that this can only be replaced as a whole.

OBJECT OF THE INVENTION

The object of the invention is therefore to provide electrical machines of the type cited initially which avoid the above disadvantages and have a compact arrangement which can be produced economically and is reliable in operation.

SOLUTION ACCORDING TO THE INVENTION

The solution according to the invention comprises a fluid-cooled electrical machine with a housing in which are arranged a stator and a rotor with stator and/or rotor coils, wherein the electrical machine is coupled heat-conductively with a cooling device arranged on its periphery and is connected with an electronic power control. The electronic power control is divided into several modules each of which are electrically connected with at least one of the stator and/or rotor coils, wherein the modules are arranged distributed on the periphery of the electrical machine and coupled heat-conductively with the cooling device lying radially on the outside or inside.

For internal rotor machines, the cooling device is arranged on the outer periphery of the electrical machine, wherein the modules of the electronic power control are arranged lying radially on the outside of the cooling device. For external rotor machines, the internal stator and its coils are cooled by an internal (ring cylindrical) cooling device, on the inner periphery of which are arranged the modules. The cooling device has fluid channels passing through it. These can either surround the electrical machine helically or run substantially coaxially to the rotation axis of the electrical machine.

The cooling device on its outer or inner wall has at least one opening reaching at least one of the fluid channels and into which protrude cooling elements arranged on one of the modules of the electrical power control. These cooling elements can for example be formed as ribs, webs or pins.

Instead of arranging and cooling the power control electronics for the electrical machine separately from this as before, the solution according to the invention describes how to integrate the electrical machine and power control electronics and cool them with the same cooling device. This saves considerable space and costs. Also if any repairs are necessary, it is substantially easier and cheaper to replace merely one or several faulty modules and not the power control electronics as a whole. Furthermore the invention also allows a considerable reduction in the costs of screening against electromagnetic interference radiation, as the lines conducting power at high frequency are very much shorter than in conventional—separate—arrangements. Also the circuit complexity is substantially reduced as the phase splitter rails previously used on the machine side can be omitted.

The cooling device can be integrated into the housing of the electrical machine already during its production. This is for example possible relatively easily with housings of cast iron, as here the cooling device with its fluid channels can easily be moulded into the housing wall. Preferably the stator carrier with integrated cooling is made of iron, in particular if the electrical machine is used as an auxiliary drive in a motor vehicle, as here an operating temperature range from −35° C./+150° C. must be ensured.

To improve the heat dissipation from both the electrical machine and from the modules of the electronic power control, the cooling elements protruding into the fluid channels are designed so that they cause turbulent flows in the fluid flowing in the fluid channels. This is achieved for example by baffle plates arranged transverse to the fluid flow, deflector vanes oriented facing towards or away from each other, or similar.

For good electrical isolation and simultaneously good thermal coupling of the power semiconductors (MOS-FETs, IGBTs, Schottky diodes etc.) in the modules of the electronic power control, the cooling elements protruding into the fluid channels and/or the module covers are made of non-ferrous metal, preferably material containing copper or aluminium, or ceramic, preferably aluminium oxide, aluminium nitride, and/or material containing silicon carbide. The material combination should be selected so that insulation is possible against the coolant casing and/or coolant. In a particularly advantageous embodiment the cooling elements protruding into the fluid channels and/or the module covers are made of ceramic material coated on one or both sides with metal, for example copper, with cooling lugs attached or moulded on.

In order to connect the electronic power control components located in the modules with the stator and/or rotor coils in the shortest possible way, in the housing are arranged substantially radially oriented lines which reach from the stator and/or rotor coils to the respective modules of the electronic power control.

Furthermore arranged in or on the housing are lines oriented substantially along the periphery which connect together the respective modules of the electronic power control. Thus firstly control signals and secondly the necessary electrical power can be distributed to the modules (in motor operation) or taken from the individual modules (in generator mode).

BRIEF DESCRIPTION OF THE DRAWING

The drawing shows details of the invention in various embodiments.

DETAILED DESCRIPTION OF THE DRAWING

Figure 1:
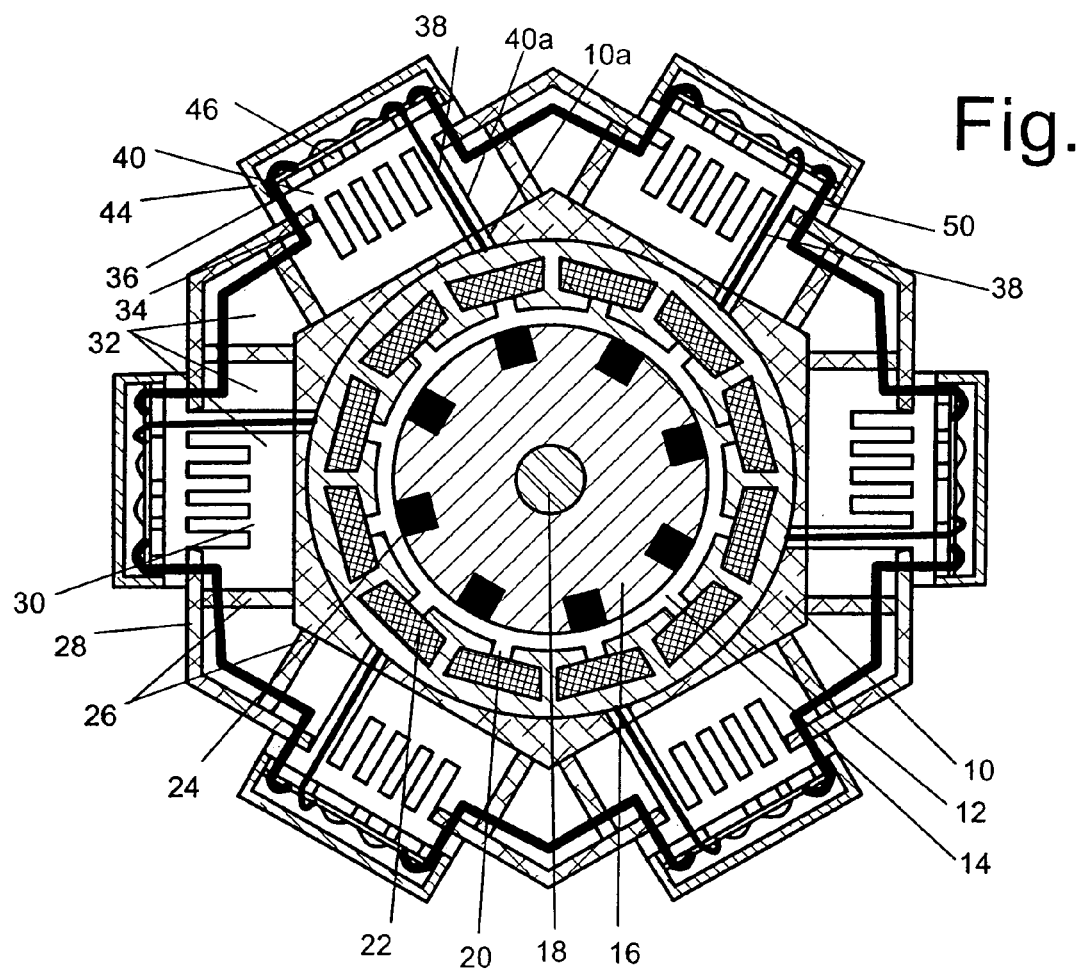
FIG. 1 shows a diagrammatic cross-sectional view through a fluid-cooled electrical machine according to the invention.

The fluid-cooled electrical machine shown in FIG. 1 is a rotary field machine formed as an internal rotor machine. This machine has a housing 10 in which are arranged a stator 12 and, separated by an air gap 14, a rotor 16 with a shaft 18. The stator 12 is formed by plates stacked above each other and has grooves 20 open towards the inner periphery surface to hold stator coils 22 merely indicated.

The rotor 16 is also formed by plates stacked above each other and along its outer periphery has, evenly distributed and coaxially to the shaft 18, rods 24 of a short-circuit cage.

The housing 10 has on its outside substantially radial webs 26 which together with the outside of the housing 10 and a casing 28 form a cooling device 30. This cooling device 30 has cooling channels 32 oriented coaxially to the shaft 18. The electric machine or its stator 12 is thermally coupled via the outside of the housing 10 with the cooling channels 32 of the cooling device 30. In the cooling channels 32 of the cooling device 30 water or oil circulates which, in a heat exchanger not shown further, dissipates to the environment the thermal energy emitted by the electrical machine.

The casing 28 of the cooling device 30 has several openings 34 through each of which protrudes a module 36 of an electronic power control. Each module 36 is electrically connected with one of the stator coils 22 by a line 38 oriented substantially radially.

The modules 36 are arranged distributed on the periphery of the electrical machine corresponding to the openings 34 and are coupled heat-conductively with the cooling device 30 through the cooling elements 40 protruding into the cooling channels 32. The cooling elements 40 are designed such that they provoke turbulent flows in the water or oil flowing in the fluid channels 32 in order to improve the heat dissipation from the modules 36 of the electronic power control and from the electrical machine. The cooling elements 40 have a web 40a which extends through the fluid channel 32 radially through the outer wall of the housing 10 in an opening 10a as far as the stator 12 or the respective stator coil 22. In the web 40a is guided the line 38 from the module 36 to the respective stator coil 22. Alternatively the line 38 can be guided in one of the webs 26 of the cooling device 30 from the module 36 to the respective stator coil 22.

The modules 36 of the electronic power control have a substantially cuboid shape and between an outer cover 44 and the cooling element 40 have electronics containing power semiconductors 46. The power semiconductors 46 which generate lost heat are thermally coupled with the cooling element 40.

The covers 44 of the module 40 are made of material containing copper or aluminium and the cooling elements 40 are formed from aluminium oxide, aluminium nitride or silicon carbide.

Between the outer wall of the housing 10 and the casing 28 are arranged lines 50 which are oriented substantially along the periphery for the supply or output of electrical power and control signals to co-ordinate operation of the control electronics and connect together the respective modules 36 of the electronic power control.

At each through-passage of the lines 38, 50 are seals not shown further. Similarly the contact surfaces of the cooling elements 40 on the openings 34 of the casing 28 are fitted with corresponding seals.

Finally it should be noted that the drawings serve merely to illustrate the principles and explain the invention; the actual dimensions and proportions of embodiments of the invention may deviate therefrom.

What is claimed is:

1. A fluid-cooled electrical machine comprising:

a housing (10) in which are arranged a stator (12) and a rotor (16) with stator and/or rotor coils (22, 24), wherein the electrical machine is coupled heat-conductively with a cooling device (30) arranged on its periphery and connected with an electronic power control, wherein the electronic power control is divided into several modules (36) each of which are electrically connected with at least one of the stator and/or rotor coils (22, 24), wherein the modules (36) are arranged distributed on the periphery of the electrical machine and arranged lying radially on the outside or inside of the cooling device (30) and coupled heat-conductively thereto, wherein through the cooling device (30) run fluid channels (32), and wherein the cooling device (30) has on its outer or inner wall at least one opening (34) for at least one of the fluid channels (32), and cooling elements (40) arranged on one of the modules (36) protrude through the opening (34) and into the fluid channels (36).

2. Fluid-cooled electrical machine according to the preceding claim 1, characterised in that the cooling elements (40) protruding into the fluid channels (32) are designed such that they cause turbulent flows in the fluid flowing in the fluid channels (32).

3. Fluid-cooled electrical machine according to claim 1, characterised in that the cooling elements (40) protruding into the fluid channels (32) and/or covers (44) of the modules (36) are made of non-ferrous metal, preferably material containing copper or aluminium, or from ceramic, preferably of aluminium oxide, aluminium nitride and/or material containing silicon carbide.

4. Fluid-cooled electrical machine according to claim 1, characterised in that in the housing (10) are arranged substantially radially oriented lines (38) which connect the stator and/or rotor coils (22, 24) with the respective modules (36) of the electronic power control.

5. Fluid-cooled electrical machine according to claim 1, characterised in that in or on the housing (10) are arranged lines (50) oriented substantially along the periphery and connecting together the respective modules (36) of the electronic power control.

6. The fluid-cooled electrical machine of claim 1, wherein the cooling elements (40) comprise at least one of ribs, webs, and pins.

7. A fluid-cooled electrical machine comprising:

a housing (10) in which are arranged a stator (12) and a rotor (16) with stator and/or rotor coils (22, 24), wherein the electrical machine is coupled heat-conductively with a cooling device (30) arranged on its periphery and connected with an electronic power control, wherein the electronic power control is divided into several modules (36) each of which are electrically connected with at least one of the stator and/or rotor coils (22, 24), wherein the modules (36) are arranged distributed on the periphery of the electrical machine and arranged lying radially on the outside or inside of the cooling device (30) and coupled heat-conductively thereto and with fluid channels (32) running through such that the cooling device (30) has on its outer or inner wall at least one opening (34) for at least one of the fluid channels (32), and cooling elements (40) arranged on one of the modules (36) protrude through the opening (34) and into the fluid channels (36), and wherein in or on the housing (10) are arranged lines (50) oriented substantially along the periphery and connecting together the respective modules (36) of the electronic power control.

8. Fluid-cooled electrical machine according to the preceding claim 7, characterised in that the cooling elements (40) protruding into the fluid channels (32) are designed such that they cause turbulent flows in the fluid flowing in the fluid channels (32).

9. Fluid-cooled electrical machine according to claim 7, characterised in that the cooling elements (40) protruding into the fluid channels (32) and/or covers (44) of the modules (36) are made of non-ferrous metal, preferably material containing copper or aluminium, or from ceramic, preferably of aluminium oxide, aluminium nitride and/or material containing silicon carbide.

10. Fluid-cooled electrical machine according to claim 7, characterised in that in the housing (10) are arranged substantially radially oriented lines (38) which connect the stator and/or rotor coils (22, 24) with the respective modules (36) of the electronic power control.

11. The fluid-cooled electrical machine of claim 7, wherein the cooling elements (40) comprise at least one of ribs, webs, and pins.

* * * * *